US012763351B2

(12) United States Patent
Miura

(10) Patent No.: US 12,763,351 B2
(45) Date of Patent: Oct. 13, 2026

(54) FUEL CELL AND METHOD FOR MANUFACTURING FUEL CELL

(71) Applicant: NISSAN MOTOR CO., LTD., Yokohama (JP)

(72) Inventor: Yohei Miura, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 461 days.

(21) Appl. No.: 18/294,453

(22) PCT Filed: Aug. 5, 2021

(86) PCT No.: PCT/JP2021/029159

§ 371 (c)(1),
(2) Date: Feb. 1, 2024

(87) PCT Pub. No.: WO2023/012979

PCT Pub. Date: Feb. 9, 2023

(65) Prior Publication Data

US 2024/0339642 A1 Oct. 10, 2024

(51) Int. Cl.

| | |
|---|---|
| ***H01M 8/1226*** | (2016.01) |
| ***H01M 4/86*** | (2006.01) |
| ***H01M 8/0254*** | (2016.01) |
| *H01M 8/12* | (2016.01) |

(52) U.S. Cl.
CPC ....... *H01M 8/1226* (2013.01); *H01M 4/8626* (2013.01); *H01M 8/0254* (2013.01); *H01M 2008/1293* (2013.01)

(58) Field of Classification Search
CPC ....... H01M 2008/1293; H01M 4/8626; H01M 8/0232; H01M 8/0245; H01M 8/0254; H01M 8/0297; H01M 8/1226; H01M 8/1286; Y02E 60/50; Y02P 70/50
See application file for complete search history.

(56) References Cited

FOREIGN PATENT DOCUMENTS

JP 2005-294152 A 10/2005

*Primary Examiner* — Victoria H Lynch
(74) *Attorney, Agent, or Firm* — Foley & Lardner LLP

(57) ABSTRACT

Provided is a fuel cell that is laminated via a separator to constitute a fuel cell stack. The fuel cell includes an anode layer, a solid electrolyte layer, and a cathode layer laminated in this order on a metal support on the separator. The metal support and the anode layer are made of a porous metal, and a reforming catalyst is formed inside at least one of the metal support and the anode layer. A thermal conduction inhibiting layer is formed between the metal support and the separator, the thermal conduction inhibiting layer being joined to the separator at least at a portion where the fuel cell and the separator are joined to each other and inhibiting thermal conduction from the separator to the metal support.

10 Claims, 4 Drawing Sheets

FUEL CELL AND METHOD FOR MANUFACTURING FUEL CELL

TECHNICAL FIELD

The present invention relates to a fuel cell and a method for manufacturing a fuel cell.

BACKGROUND ART

JP2005-294152A discloses a solid oxide fuel cell (SOFC) laminated via a separator. In this SOFC, a fuel electrode collector is disposed outside an anode layer, and a separator is disposed outside the fuel electrode collector. Further, a porous metal body supporting a reforming catalyst is disposed between the separator and the fuel electrode collector. Accordingly, reforming (internal reforming) of a fuel gas is performed inside the SOFC.

SUMMARY OF INVENTION

In JP2005-294152A, since the reforming catalyst is supported on the metal body having high thermal conductivity and is disposed between the separator and the fuel electrode collector, the reforming catalyst is easily affected by heat from the separator. In particular, in a case where laser welding or the like is performed in order to strengthen joining between the separator and the metal body, there is a concern that sintering may occur in the reforming catalyst in the metal body due to the influence of heat necessary for the joining, and the power generation efficiency may decrease.

In view of the above problems, an object of the present invention is to provide a fuel cell with good power generation efficiency in which sintering of a reforming catalyst is prevented.

According to an aspect of this invention, there is provided a fuel cell that is laminated via a separator to constitute a fuel cell stack. The fuel cell includes an anode layer, a solid electrolyte layer, and a cathode layer laminated in this order on a metal support on the separator. The metal support and the anode layer are made of a porous metal, and a reforming catalyst is formed inside at least one of the metal support and the anode layer. A thermal conduction inhibiting layer is formed between the metal support and the separator, the thermal conduction inhibiting layer being joined to the separator at least at a portion where the fuel cell and the separator are joined to each other and inhibiting thermal conduction from the separator to the metal support.

DESCRIPTION OF EMBODIMENTS

Hereinafter, embodiments of the present invention will be described with reference to the drawings.

First Embodiment

Figure 1:
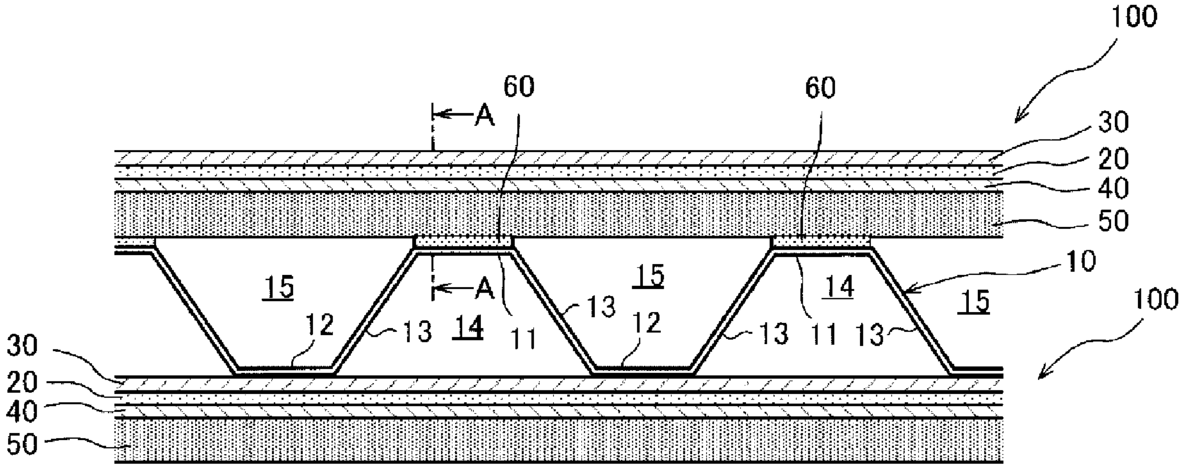
FIG. 1 is a schematic configuration diagram of a fuel cell according to a first embodiment.

FIG. 1 is a schematic configuration diagram of a fuel cell 100 according to a first embodiment. The fuel cell 100 is a solid oxide fuel cell (SOFC), and generates power by receiving supply of anode gas and cathode gas. A plurality of the fuel cells 100 are laminated to form a fuel cell stack, and a plate-like separator 10 is provided between the adjacent fuel cells 100.

The fuel cell stack configured by laminating the fuel cells 100 is assumed to be mounted on a mobile vehicle such as an electric automatic vehicle or a hybrid automatic vehicle, but may be used as a power source or the like of various electric devices.

As shown in FIG. 1, each of the fuel cells 100 includes a solid electrolyte layer 20, a cathode layer 30 disposed on one surface of the solid electrolyte layer 20, an anode layer 40 disposed on the other surface of the solid electrolyte layer 20, and a metal support 50 provided to support the anode layer 40.

The solid electrolyte layer 20 is a thin film body formed of an oxide having oxygen ion conductivity, and is sandwiched between the anode layer 40 and the cathode layer 30. Examples of the oxide include yttria stabilized zirconia (YSZ), scandium stabilized zirconia (SSZ), samarium-doped ceria (SDC), gadolinium-doped ceria (GDC), and lanthanum strontium magnesium gallate (LSGM).

The cathode layer 30 is a plate-like member formed of, for example, lanthanum strontium cobalt composite oxide (LSC) or lanthanum strontium cobalt iron oxide (LSCF), and is provided to be in contact with an upper surface of the solid electrolyte layer 20. A reduction reaction of reducing oxygen in the cathode gas (air) occurs in the cathode layer 30.

The anode layer 40 is a plate-like member of a porous metal formed of a metal such as nickel (Ni) and an oxide such as yttria stabilized zirconia (YSZ). The anode layer 40 is provided to be in contact with a lower surface of the solid electrolyte layer 20, and is placed on the metal support 50. An oxidation reaction of oxidizing the anode gas containing hydrogen or the like by oxide ions conducted through the solid electrolyte layer 20 occurs in the anode layer 40. The fuel cell 100 generates power based on an electrode reaction in the cathode layer 30 and the anode layer 40.

The metal support 50 is a porous plate-like member formed of a metal such as stainless steel, iron (Fe), or nickel (Ni). The metal support 50 is provided to support the anode layer 40, and functions as a structural member for reinforcing a strength of the fuel cell 100. In this way, the fuel cell 100 is configured as a so-called metal support type fuel cell in which the anode layer 40, the solid electrolyte layer 20, and the cathode layer 30 are laminated in this order on the metal support 50 as a support.

In addition, a reforming catalyst that reforms a raw fuel containing hydrocarbons into an anode gas containing hydrogen as a main component is formed inside the anode layer 40 and the metal support 50. The raw fuel containing hydrocarbons is supplied from a fuel flow path 15 to be described later to the anode layer 40 via the metal support 50, and in a process of the supply, is reformed into an anode gas containing hydrogen as a main component by the reforming catalyst in the metal support 50 and the anode layer 40. That is, the fuel cell 100 is an internal reforming type fuel cell.

The separator 10 is a plate-like member provided between the adjacent fuel cells 100 of the laminated fuel cells 100. A material forming the separator 10 is not particularly limited as long as it is an electroconductive and thermally conductive material, and for example, an alloy containing iron (Fe) or chromium (Cr), or a metal is used. The separator 10 is a plate-like member formed by press-molding the above electroconductive and thermally conductive material, and is electrically connected to the fuel cell 100.

The separator 10 includes first abutting portions 11 that abut against a lower surface of one fuel cell 100 of the two adjacent fuel cells 100, second abutting portions 12 that abut against an upper surface of the other fuel cell 100, and connecting portions 13 that connect the first abutting portions 11 and the second abutting portions 12, respectively.

The separator 10 is configured as a concave-convex member by connecting the first abutting portions 11 and the second abutting portions 12, which are alternately (in order) arranged in a predetermined direction (separator width direction), by the connecting portions 13, respectively. With such a concave-convex structure, the separator 10 includes a plurality of air flow paths 14 on a surface on one side and a plurality of the fuel flow paths 15 on a surface on the other side. In FIG. 1, each of the connecting portions 13 is formed in a linear shape, and each of the fuel flow paths 15 is formed such that a cross-sectional area of the flow path in a front direction is trapezoidal, but the present invention is not necessarily limited thereto. For example, the connecting portion 13 may be formed in a curved shape, and the cross-sectional area of the fuel flow path 15 may be curved. That is, the concavo-convex shape referred to here includes a curved shape. Since the separator 10 has a concave-convex structure (including a curved shape) in this way, even when the fuel cell 100 is displaced, the separator 10 can follow the displacement.

The first abutting portion 11 of the separator 10 is formed as a flat surface, and abuts against the metal support 50 of one of the fuel cells 100 via a thermal conduction inhibiting layer 60 to be described later. The separator 10 is fixed to one of the fuel cells 100 by, for example, welding the first abutting portions 11 and the thermal conduction inhibiting layer 60.

The second abutting portion 12 of the separator 10 is formed as a flat surface and abuts against the cathode layer 30 of the other of the fuel cells 100. The separator 10 is fixed to the other of the fuel cells 100 by, for example, welding the second abutting portions 12 and a part of the cathode layer 30.

The connecting portion 13 of the separator 10 is formed as a wall portion that connects an end portion of the first abutting portion 11 and an end portion of the second abutting portion 12. A space formed by the connecting portion 13, the second abutting portion 12, and the metal support body 50 serves as the fuel flow path 15 for supplying fuel to the anode layer 40. On the other hand, a space formed by the connecting portion 13, the first abutting portion 11, and the cathode layer 30 serves as the air flow path 14 for supplying oxygen to the cathode layer 30.

In the fuel cell 100 configured as described above, the fuel is supplied from the fuel flow path 15 to the anode layer 40 via the metal support 50 connected to the separator 10, and the fuel is reformed by the reforming catalyst formed inside the metal support 50 and the anode layer 40.

Incidentally, in a case where the porous metal constituting the metal support 50 has high thermal conductivity and the metal support 50 and the separator 10 are in contact with each other, the reforming catalyst inside the metal support 50 is easily affected by heat from the separator 10. In particular, when the separator 10 and the metal support 50 are joined to each other by laser welding or the like, there is a concern that sintering of the reforming catalyst inside the metal support 50 may occur due to the influence of heat necessary for joining, and the power generation efficiency may decrease.

Therefore, in the present embodiment, the thermal conduction inhibiting layer 60 is provided between the metal support 50 and the separator 10 to inhibit thermal conduction from the separator 10 to the metal support 50. Accordingly, a distance from the separator 10 to the metal support 50 is increased, and the influence of the heat conducted from the separator 10 to the metal support 50 is reduced. Therefore, sintering or the like of the reforming catalyst inside the metal support 50 is prevented, and a decrease in power generation efficiency can be suppressed.

Hereinafter, details of the thermal conduction inhibiting layer 60 will be described.

The thermal conduction inhibiting layer 60 is made of, for example, the same material as the metal support 50, and is formed between the metal support 50 and the first abutting portion 11 of the separator 10 that abuts against the lower surface of the fuel cell 100, as shown in FIG. 1. By forming the thermal conduction inhibiting layer 60 between the separator 10 and the metal support 50, a distance from the separator 10 to the metal support 50 is increased, and the reforming catalyst inside the metal support 50 is less likely to be affected by the heat from the separator 10 and an interface between the separator 10 and the thermal conduction inhibiting layer 60 (hereinafter referred to as heat from the separator 10). In addition, by forming the thermal conduction inhibiting layer 60 with the same material as the metal support 50, the joining at an interface between the thermal conduction inhibiting layer 60 and the metal support 50 (collection joining on an anode side) is strengthened, and the power generation performance is improved.

Figure 2:
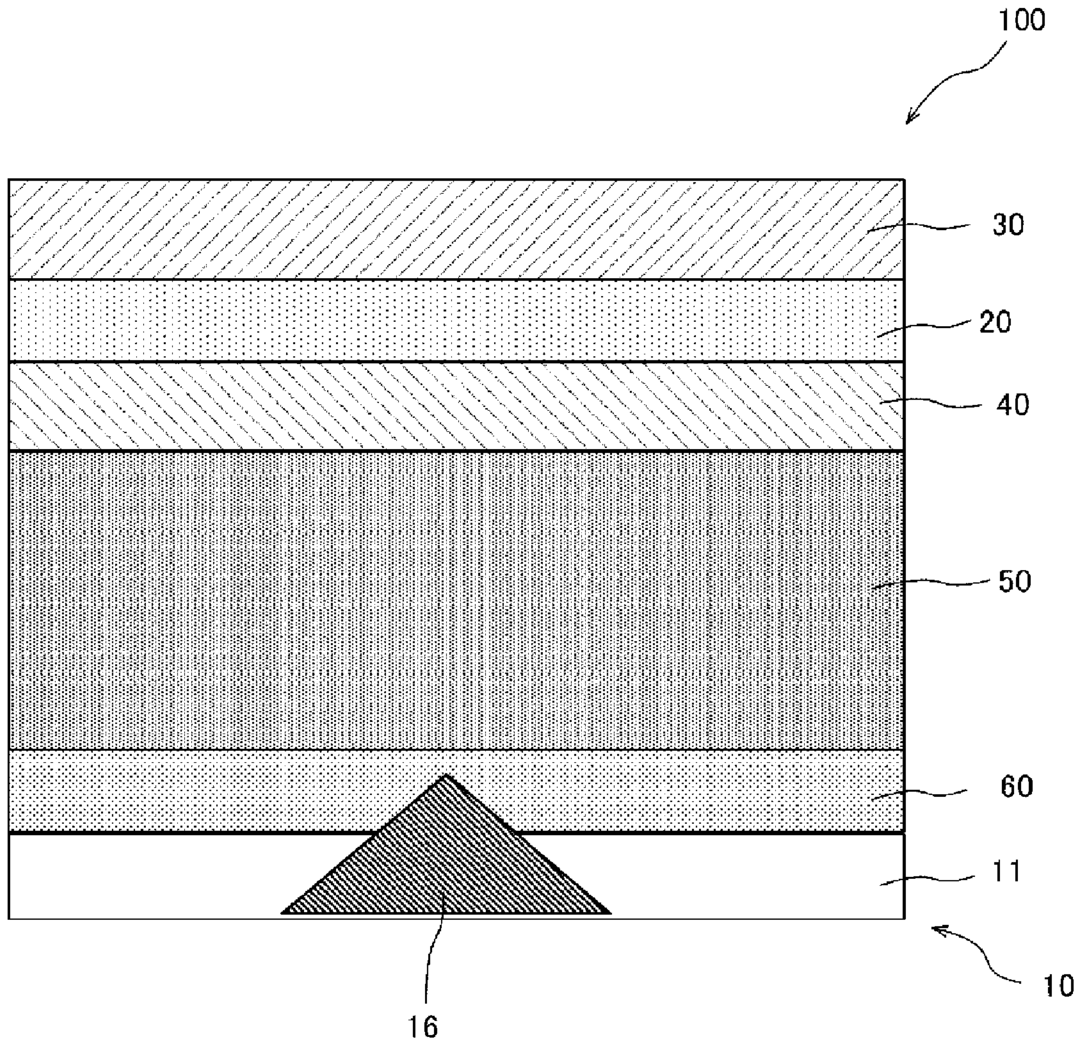
FIG. 2 is a schematic view illustrating a laminated structure of the fuel cell.

FIG. 2 is a schematic view illustrating a laminated structure of the fuel cell 100, and is a cross-sectional view taken along a line A-A in FIG. 1.

As described above, the thermal conduction inhibiting layer 60 is formed between the first abutting portion 11 of the separator 10 and the metal support 50. The thermal conduction inhibiting layer 60 is a porous metal body made of the same material as the metal support 50, but the thermal conduction inhibiting layer 60 is configured to have a porosity higher than a porosity of the metal support 50. Therefore, a thermal conduction area of the thermal conduction inhibiting layer 60 is smaller than a thermal conduction area of the metal support 50, and the heat from the separator 10 such as welding heat is less likely to be conducted to the metal support 50. Therefore, the effect of the heat on the reforming catalyst in the metal support 50 is further suppressed, and sintering or the like is more reliably prevented.

In addition, the thermal conduction inhibiting layer 60 supports a material having a thermal conductivity lower than a thermal conductivity of the material constituting the metal support 50, such as an oxide of cerium (Ce), zirconium (Zr), aluminum (Al), barium (Ba), or yttrium (Y). Accordingly, a thermal conductivity of the thermal conduction inhibiting layer 60 is lower than a thermal conductivity of the metal support 50, and the heat from the separator 10 is less likely to be conducted to the metal support 50. Therefore, the effect of the heat on the reforming catalyst in the metal support 50 is further suppressed, and sintering or the like is more reliably prevented. The anode layer 40 may also support an oxide or the like having low thermal conductivity.

In addition, the separator 10 is fixed to one of the fuel cells 100 by welding the first abutting portion 11 and the thermal conduction inhibiting layer 60, and the weld bead 16 formed by the welding is formed from the separator 10 into the thermal conduction inhibiting layer 60. As shown in FIG. 2, the vicinity of the weld bead 16 is covered with the thermal conduction inhibiting layer 60, and the weld bead 16 is formed only in the thermal conduction inhibiting layer 60 and does not reach the inside of the metal support 50. The weld bead 16 serves as a thermal conduction path for conducting the heat from the separator 10, but in the present embodiment, the thermal conduction inhibiting layer 60 is formed near the portion where the weld bead 16 is generated, and therefore, the heat from the separator 10 is less likely to be conducted to the metal support 50. Therefore, the reforming catalyst in the metal support 50 is less likely to be affected by the heat from the separator 10, and sintering or the like is prevented. In addition, in a case where the weld bead 16 is formed up to the inside of the metal support 50, the heat from the separator 10 is easily conducted to the metal support 50, but in the present embodiment, the weld bead 16 is formed only in the thermal conduction inhibiting layer 60. Therefore, the heat from the separator 10 is less likely to be conducted to the reforming catalyst in the metal support 50, and sintering or the like is prevented.

Next, a manufacturing process of the fuel cell 100 will be described.

Figure 3:
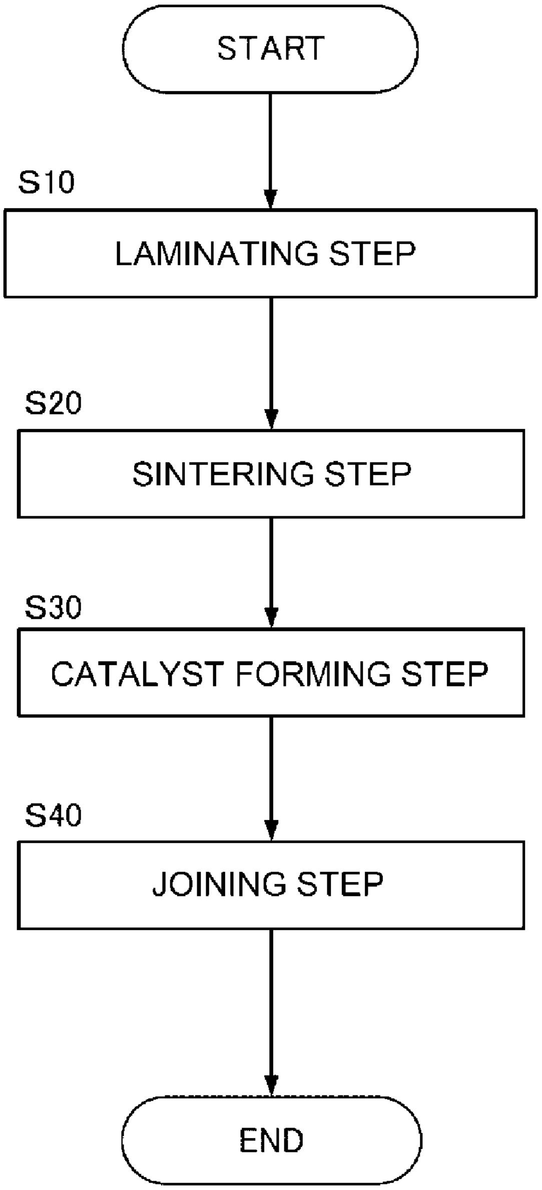
FIG. 3 is a flowchart showing a manufacturing process of the fuel cell.

FIG. 3 is a flowchart showing the manufacturing process of the fuel cell 100. As shown in FIG. 3, the manufacturing process of the fuel cell 100 includes a laminating step (S10), a sintering step (S20), a catalyst forming step (S30), and a joining step (S40).

In the laminating step (S10), the anode layer 40, the solid electrolyte layer 20, and the cathode layer 30 made of a porous metal are laminated in this order on the metal support 50 made of a porous metal. At this time, the respective layers may be bonded by a method such as roll pressing.

In the sintering step (S20), the thermal conduction inhibiting layer 60 made of a porous metal, and the metal support 50, the anode layer 40, the solid electrolyte layer 20, and the cathode layer 30, which are laminated in the lamination step (S10) are co-sintered from a lower surface side of the metal support 50 to be integrated, thereby forming a laminate. By co-sintering the thermal conduction inhibiting layer 60, and the metal support 50, the anode layer 40, the solid electrolyte layer 20, and the cathode layer 30 in this way, the joining of the respective layers can be strengthened as compared with a case where the respective layers are separately sintered, and the manufacturing process can be simplified.

As described above, since the thermal conduction inhibiting layer 60 and the metal support 50 are made of the same material, the interface between the thermal conduction inhibiting layer 60 and the metal support 50 is firmly joined by co-sintering. That is, the collection joining on an anode side is strengthened, and the power generation performance of the fuel cell 100 is improved.

After the laminate is formed in the sintering step (S20), the reforming catalyst is formed in the anode layer 40 and the metal support 50 by an impregnation method in the catalyst forming step (S30). Specifically, the catalyst forming step (S30) is performed in the following procedure. First, a metal solution (catalyst solution) containing nickel (Ni), platinum (Pt), rhodium (Rh), palladium (Pd), iridium (Ir), manganese (Mn), cobalt (Co), and the like, which are reforming catalyst materials, is prepared. Next, the catalyst solution is dropped onto the laminate from the outside (anode side) of the metal support 50 to permeate a porous skeleton of the metal support 50 and the anode layer 40. Next, heat treatment is performed to precipitate catalyst particles. Accordingly, the reforming catalyst is formed in the anode layer 40 and the metal support 50. By forming a reforming catalyst using an impregnation method in this way, the catalyst penetrates into the porous metal, and a specific surface area of the catalyst is increased, as compared with a case where the catalyst is formed by a spray coating method or the like. Therefore, the catalytic activity is increased and the catalytic performance is improved. The reforming catalyst may also be formed in the thermal conduction inhibiting layer 60 made of a porous metal.

After the reforming catalyst is formed, the lower surface of the thermal conduction inhibiting layer 60 in the laminate including the thermal conduction inhibiting layer 60, the metal support 50, the anode layer 40, the solid electrolyte layer 20, and the cathode layer 30 is joined to the first abutting portion 11 of the separator 10 in the joining step (S40). The joining to the separator 10 can be performed by laser welding or the like. At this time, although the heat generated by the laser welding is input to the laminate, conduction of the welding heat to the metal support 50 is suppressed by the thermal conduction inhibiting layer 60, and the reforming catalyst in the metal support 50 is prevented from sintering. In a case where a reforming catalyst is also formed in the thermal conduction inhibiting layer 60, sintering of the reforming catalyst in the thermal conduction inhibiting layer 60 may occur by the welding heat, but sintering of the reforming catalyst in the metal support 50 and the anode layer 40 may not occur.

As described above, the fuel cell 100 is manufactured by laminating the anode layer 40, the solid electrolyte layer 20, and the cathode layer 30 on the metal support 50, performing co-sintering with the thermal conduction inhibiting layer 60, forming a reforming catalyst by an impregnation method, and welding the thermal conduction inhibiting layer 60 to the separator 10.

With the fuel cell 100 and the method for manufacturing the fuel cell 100 according to the first embodiment, the following effects can be obtained.

In the fuel cell 100, the thermal conduction inhibiting layer 60 that inhibits thermal conduction from the separator 10 to the metal support 50 is formed between the metal support 50 and the separator 10 at a portion where the fuel cell 100 and the separator 10 are joined to each other. Accordingly, a distance from the separator 10 to the metal support 50 is increased, and the heat from the separator 10 such as the welding heat is prevented from being conducted to the metal support 50 and from affecting the reforming catalyst inside the metal support 50. Therefore, sintering or the like of the reforming catalyst inside the metal support 50 can be prevented, and a decrease in power generation efficiency can be prevented.

In the fuel cell 100, the porosity of the thermal conduction inhibiting layer 60 is larger than the porosity of the metal support 50. Therefore, the thermal conduction area of the thermal conduction inhibiting layer 60 is smaller than the thermal conduction area of the metal support 50, and the heat from the separator 10 such as welding heat is less likely to be conducted to the metal support 50. Therefore, the effect of the heat on the reforming catalyst in the metal support 50 can be further suppressed, and sintering or the like can be further prevented.

In the fuel cell 100, the thermal conduction inhibiting layer 60 is made of the same material as the metal support 50. Accordingly, the joining at the interface between the thermal conduction inhibiting layer 60 and the metal support 50 (collection joining on the anode side) is strengthened, and the power generation performance is improved.

In the fuel cell 100, the thermal conduction inhibiting layer 60 supports a substance having a thermal conductivity lower than a thermal conductivity of the material constituting the metal support 50. Accordingly, the thermal conductivity of the thermal conduction inhibiting layer 60 is lower than the thermal conductivity of the metal support 50, and the heat from the separator 10 is less likely to be conducted to the metal support 50. Therefore, the effect of the heat on the reforming catalyst in the metal support 50 can be further suppressed, and sintering or the like can be further prevented.

In the fuel cell 100, the separator 10 is formed of a concave-convex member including the first abutting portions 11 that abut against the lower surface of one fuel cell 100 of the adjacent fuel cells 100, the second abutting portions 12 that abut against the upper surface of the other fuel cell 100, and the connecting portions 13 that connect the first abutting portions 11 and the second abutting portions 12, respectively, and the thermal conduction inhibiting layer 60 is formed at a portion in the fuel cell 100 that abuts against the first abutting portion 11. Since the thermal conduction inhibiting layer 60 is formed between the separator 10 and the metal support 50 at a portion where the separator 10 and the fuel cell 100 abut against each other in this way, the distance from the separator 10 to the metal support 50 is increased. Therefore, the reforming catalyst inside the metal support 50 is less likely to be affected by the heat from the separator 10, and sintering or the like can be prevented.

In the fuel cell 100, the weld bead 16 is formed only in the thermal conduction inhibiting layer 60. That is, the weld bead 16 serving as a thermal conduction path for conducting the heat from the separator 10 does not reach the inside of the metal support 50. Therefore, the heat from the separator 10 is less likely to be conducted to the reforming catalyst in the metal support 50, and sintering or the like of the reforming catalyst is prevented.

In the fuel cell 100, the thermal conduction inhibiting layer 60 is formed near a portion where the weld bead 16 is formed. Therefore, the heat from the separator 10 is less likely to be conducted to the reforming catalyst in the metal support 50, and sintering or the like of the reforming catalyst is prevented.

The method for manufacturing the fuel cell 100 includes the following steps. That is, after the anode layer 40, the solid electrolyte layer 20, and the cathode layer 30 are laminated in this order on the metal support 50, co-sintering with the thermal conduction inhibiting layer 60 is performed from the lower surface side of the metal support 50 to be integrated, thereby forming a laminate. Then, a reforming catalyst is formed in the anode layer 40 and the metal support 50, and the lower surface of the thermal conduction inhibiting layer 60 in the laminate is joined to the separator 10. Since the thermal conduction inhibiting layer 60, the metal support 50, the anode layer 40, the solid electrolyte layer 20, and the cathode layer 30 are co-sintered in this way, the joining of the layers can be strengthened as compared with a case where the layers are separately sintered, and the manufacturing process can be simplified.

In the method for manufacturing the fuel cell 100, a reforming catalyst solution is impregnated to form a reforming catalyst in the anode layer 40 and the metal support 50. By forming a reforming catalyst by using an impregnation method, the catalyst permeates into the porous metal and the specific surface area of the catalyst is increased as compared with a case where a catalyst is formed by a spray coating method or the like. Therefore, the catalytic activity is increased, the catalytic performance is improved, and the power generation efficiency of the fuel cell 100 is improved.

In the present embodiment, the thermal conduction inhibiting layer 60 is formed only between the metal support 50 and the first abutting portion 11 of the separator 10, but the thermal conduction inhibiting layer 60 may be formed at a portion other than the lower surface of the metal support 50. For example, the thermal conduction inhibiting layer 60 may be formed on the entire lower surface of the metal support 50.

In the present embodiment, the separator 10 is fixed to the fuel cell 100 by welding the first abutting portion 11 and the thermal conduction inhibiting layer 60, but the method of joining the separator 10 and the fuel cell 100 is not limited to welding. For example, a method such as energization joining of joining by Joule heat when electricity flows may be used.

As in the present embodiment, the thermal conduction inhibiting layer 60 is preferably made of a porous metal having a porosity higher than a porosity of the metal support 50, but the present invention is not necessarily limited thereto. For example, the thermal conduction inhibiting layer 60 and the metal support 50 may have substantially the same porosity.

As in the present embodiment, the thermal conduction inhibiting layer 60 is preferably made of the same material as the metal support 50, but the present invention is not necessarily limited thereto, and the thermal conduction inhibiting layer 60 may be formed of a material (including a material other than the porous material) different from the metal support 50 as long as the distance between the metal support 50 and the separator 10 can be increased.

As in the present embodiment, the thermal conduction inhibiting layer 60 preferably supports a substance having a thermal conductivity lower than a thermal conductivity of the material constituting the metal support 50, but the present invention is not necessarily limited thereto, and the thermal conduction inhibiting layer 60 may not support such a substance.

In the present embodiment, the separator 10 is formed of a concave-convex member, but the shape of the separator 10 is not necessarily limited thereto as long as the air flow path 14 and the fuel flow path 15 can be formed.

As in the present embodiment, in the method for manufacturing the fuel cell 100, it is preferable that the anode layer 40, the solid electrolyte layer 20, and the cathode layer 30 are laminated in this order on the metal support 50, and then co-sintered with the thermal conduction inhibiting layer 60, but the present invention is not necessarily limited thereto, and the respective layers may be separately sintered.

As in the present embodiment, in the method for manufacturing the fuel cell 100, a reforming catalyst is preferably formed using an impregnation method, but the present invention is not necessarily limited thereto, and any known method may be used as the method for forming a reforming catalyst.

In the present embodiment, the reforming catalyst is formed inside the anode layer 40 and the metal support 50, but the present invention is not limited thereto, and the reforming catalyst may be formed in either the anode layer 40 or the metal support 50. When the reforming catalyst is formed in the anode layer 40 or the metal support 50, sintering or the like of the reforming catalyst inside the anode layer 40 or the metal support 50 is also prevented by the thermal conduction inhibiting layer 60.

Second Embodiment

The fuel cell 100 according to a second embodiment will be described with reference to FIG. 4. The same elements as those in the first embodiment are denoted by the same reference numerals, and the description thereof is omitted.

Figure 4:
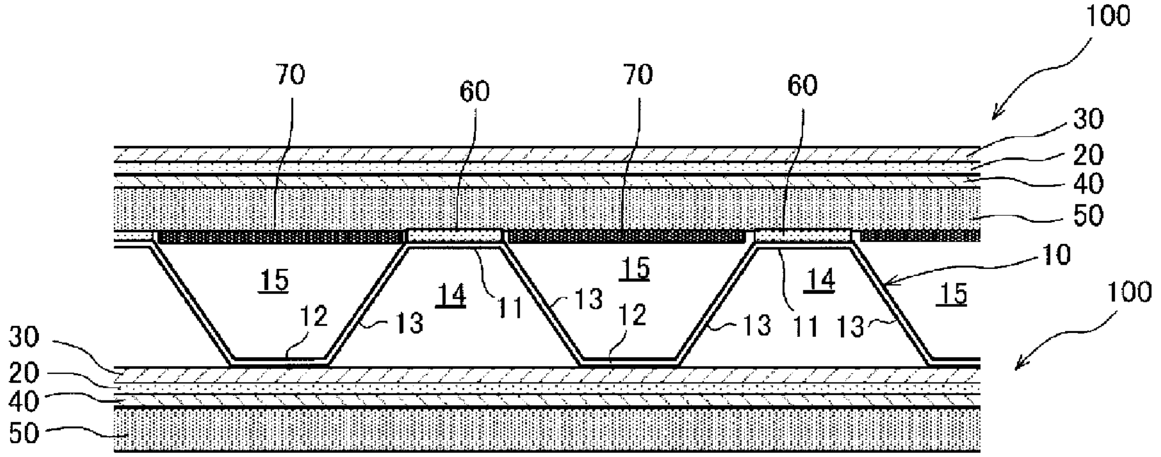
FIG. 4 is a schematic configuration diagram of a fuel cell according to a second embodiment.

FIG. 4 is a schematic configuration diagram of the fuel cell 100 according to the second embodiment. The present embodiment is different from the first embodiment in that the fuel cell 100 includes a reforming layer 70.

As in the first embodiment, the thermal conduction inhibiting layer 60 is formed at a portion of a lower surface of the fuel cell 100 that abuts against the first abutting portion 11 of the separator 10. On the other hand, as shown in FIG. 4, the reforming layer 70 is formed at a portion of the bottom surface of the fuel cell 100, that does not abut against the first abutting portion 11 of the separator 10 (that is, a portion where the thermal conduction inhibiting layer 60 is not formed).

The reforming layer 70 is formed of a reforming catalyst in which a catalyst metal is supported on a catalyst carrier. The catalyst carrier of the reforming catalyst constituting the reforming layer 70 is made of cerium oxide ($CeO_2$), aluminum oxide ($Al_2O_3$), zirconia ($ZrO_2$), barium oxide (BaO), yttrium oxide ($Y_2O_3$), and a solid solution oxide thereof. The catalytic metal of the reforming catalyst constituting the reforming layer 70 includes nickel (Ni), platinum (Pt), rhodium (Rh), palladium (Pd), iridium (Ir), manganese (Mn), cobalt (Co), and the like.

The reforming layer 70 is formed, by a spray coating method, on the lower surface of the metal support 50 at a portion of the lower surface of the fuel cell 100 that does not abut against the first abutting portion 11 of the separator 10.

By providing the reforming layer 70 made of a reforming catalyst at a portion of the lower surface of the fuel cell 100 that does not abut against the first abutting portion 11 of the separator 10 in this way, the catalytic activity of the fuel cell 100 is improved.

In addition, the catalyst carrier made of an oxide can suppress carbon deposition in the fuel cell 100.

In the present embodiment, the reforming layer 70 is formed by a spray coating method, but the present invention is not necessarily limited thereto, and the reforming layer 70 made of a reforming catalyst may be formed by any known method.

Although the embodiments of the present invention have been described above, the above embodiments are merely a part of application examples of the present invention, and are not intend to limit the technical scope of the present invention to the specific configurations of the above embodiments.

Each of the above-described embodiments has been described as a single embodiment, but may be appropriately combined.

The invention claimed is:

1. A fuel cell that is laminated via a separator to constitute a fuel cell stack, the fuel cell comprising:

an anode layer, a solid electrolyte layer, and a cathode layer laminated in this order on a metal support on the separator, wherein the metal support and the anode layer are made of a porous metal, and a reforming catalyst is formed inside at least one of the metal support and the anode layer, and a thermal conduction inhibiting layer is formed between the metal support and the separator, the thermal conduction inhibiting layer being joined to the separator at least at a portion where the fuel cell and the separator are joined to each other and inhibiting thermal conduction from the separator to the metal support.

2. The fuel cell according to claim 1, wherein the thermal conduction inhibiting layer is made of a porous metal, and the thermal conduction inhibiting layer has a porosity higher than a porosity of the metal support.

3. The fuel cell according to claim 1, wherein the thermal conduction inhibiting layer is made of a material same as a material of the metal support.

4. The fuel cell according to claim 1, wherein the thermal conduction inhibiting layer supports a substance having a thermal conductivity lower than a thermal conductivity of the material constituting the metal support.

5. The fuel cell according to claim 1, wherein the separator is formed of a concave-convex member including a first abutting portion configured to abut against a lower surface of one fuel cell of adjacent fuel cells, a second abutting portion configured to abut against an upper surface of the other fuel cell, and a connecting portion configured to connect the first abutting portion and the second abutting portion, and the thermal conduction inhibiting layer is formed at a portion in the fuel cell abutting against the first abutting portion.

6. The fuel cell according to claim 1, wherein the separator is formed of a concave-convex member including a first abutting portion configured to abut against a lower surface of one fuel cell of adjacent fuel cells, a second abutting portion configured to abut against an upper surface of the other fuel cell, and a connecting portion configured to connect the first abutting portion and the second abutting portion, the thermal conduction inhibiting layer is formed at a portion in the fuel cell abutting against the first abutting portion, and a reforming layer made of a catalyst in which a catalyst metal is supported on a catalyst carrier made of an oxide is formed at a portion of the lower surface of the fuel cell, which does not abut against the first abutting portion.

7. The fuel cell according to claim 1, wherein the separator and the thermal conduction inhibiting layer are joined by welding, and a weld bead by the welding is formed only in the thermal conduction inhibiting layer.

8. The fuel cell according to claim 1, wherein the separator and the thermal conduction inhibiting layer are joined to each other by welding, and the thermal conduction inhibiting layer is formed near a portion where the weld bead is formed by the welding.

9. A method for manufacturing a fuel cell, the method comprising:

laminating an anode layer made of a porous metal, a solid electrolyte layer, and a cathode layer in this order on a metal support made of a porous metal, then performing co-sintering with a thermal conduction inhibiting layer made of a porous metal from a lower surface side of the metal support, and integrating the anode layer, the solid electrolyte layer, the cathode layer, and the thermal conduction inhibiting layer to form a laminate;

forming a reforming catalyst in at least one of the anode layer and the metal support; and joining a lower surface of the thermal conduction inhibiting layer in the laminate to a separator.

10. The method for manufacturing a fuel cell according to claim 9, wherein the reforming catalyst is formed in at least one of the anode layer and the metal support by being impregnated with a reforming catalyst solution.

* * * * *